(12) United States Patent
Hibara et al.

(10) Patent No.: US 9,473,320 B2
(45) Date of Patent: Oct. 18, 2016

(54) HOUSEHOLD APPLIANCE AND COMMUNICATION CONTROL METHOD

(75) Inventors: Naoyuki Hibara, Tokyo (JP); Yoshiaki Koizumi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 239 days.

(21) Appl. No.: 14/350,389

(22) PCT Filed: Jan. 26, 2012

(86) PCT No.: PCT/JP2012/051665
§ 371 (c)(1),
(2), (4) Date: Apr. 8, 2014

(87) PCT Pub. No.: WO2013/057963
PCT Pub. Date: Apr. 25, 2013

(65) Prior Publication Data
US 2014/0254606 A1    Sep. 11, 2014

(30) Foreign Application Priority Data
Oct. 21, 2011 (JP) .................. 2011-232218

(51) Int. Cl.
*H04N 5/765* (2006.01)
*H04L 12/28* (2006.01)
*H04L 12/64* (2006.01)

(52) U.S. Cl.
CPC ....... *H04L 12/2803* (2013.01); *H04L 12/6418* (2013.01); *H04L 2012/285* (2013.01)

(58) Field of Classification Search
CPC .................. H04N 5/765; H04L 2025/03426; H04L 61/2038; H04L 67/10
See application file for complete search history.

(56) References Cited

U.S. PATENT DOCUMENTS

| 6,122,754 A * | 9/2000 | Litwin ................ G06F 11/1076 711/114 |
| 2002/0083342 A1* | 6/2002 | Webb ....................... G06F 21/31 726/12 |
| 2003/0041177 A1 | 2/2003 | Warschko et al. |

FOREIGN PATENT DOCUMENTS

| JP | 06-309251 A | 11/1994 |
| JP | 07-129484 A | 5/1995 |
| JP | 2010-071595 A | 4/2010 |
| WO | 2004/032425 A1 | 4/2004 |

OTHER PUBLICATIONS

International Search Report mailed May 1, 2012 for the corresponding international application No. PCT/JP2012/051665 (with English translation).

* cited by examiner

*Primary Examiner* — Fan Ng
(74) *Attorney, Agent, or Firm* — Posz Law Group, PLC

(57) ABSTRACT

A household appliance comprises a high speed communication interface, a large volume data processing device linking up with a household appliance control device, and a low speed communication switching device. When the communication target of the household appliance control device is switched to the large volume data processing device, the large volume data processing device converts data entered via the high speed communication interface to a low speed communication format and outputs the data to the household appliance control device via the low speed communication switching device, and converts data entered from the household appliance control device via the low speed communication switching device to a high speed communication format and enters the data into the high speed communication interface.

9 Claims, 6 Drawing Sheets

(12)  US 9,473,320 B2

HOUSEHOLD APPLIANCE AND COMMUNICATION CONTROL METHOD

CROSS REFERENCE TO RELATED APPLICATION

This application is a U.S. national stage application of International Application No. PCT/JP2012/051665 filed on Jan. 26, 2012, which claims priority from, and incorporates by reference, JP Application No. 2011-232218 filed on Oct. 21, 2011.

TECHNICAL FIELD

The present invention relates to a household appliance and communication control method.

BACKGROUND ART

Systems for connecting a household appliance to a network via a communication adaptor are known in the prior art (for example, see Patent Literature 1). Such systems generally utilize a low data volume and a low speed (namely, low performance) communication device for communication between the household appliance and the communication adaptor in order to reduce the load on household appliance resources such microcomputers and to reduce the cost.

The volume of data which a household appliance deals with has been increasing year after year. For example, an air-conditioning device having an imaging element is among the household appliances dealing with a large volume of data (for example, see Patent Literature 2).

CITATION LIST

Patent Literature

Patent Literature 1: International Publication No. WO2004/032425; and
Patent Literature 2: Unexamined Japanese Patent Application Kokai Publication No. 2010-71595.

SUMMARY OF INVENTION

Technical Problem

When a household appliance dealing with a large volume of data such as the air-conditioning device disclosed in the above Patent Literature 1 is connected to a network and a large volume of data is transmitted, use of a low speed communication device prolongs the communication time. On the other hand, it is desirable to be able to continue to use an existing low speed communication device.

The present invention is invented with the view of the above circumstance and an exemplary objective of the present invention is to provide a household appliance and communication control method allowing for continuing to use a low speed communication device and enabling transmission/reception of a large volume of data using high speed communications.

Solution to Problem

In order to achieve the above objective, the household appliance according to the present invention comprises:
a low speed communication interface that connects to a network at a first communication speed;
a high speed communication interface that connects to a network at a second communication speed that is faster than the first communication speed;
a household appliance control device that controls the appliance body;
a data processing device that processes a large volume of data, outputs a processing result to the household appliance control device, and transmits the processing result via the high speed communication interface; and
a switching device that switches a communication target of the household appliance control device to the low speed communication interface or to the data processing device;
wherein when the communication target of the household appliance control device is switched to the data processing device by the switching device, the data processing device converts data entered via the high speed communication interface to a format for the first communication speed and outputs the data to the household appliance control device via the switching device, and converts data entered from the household appliance control device via the switching device to a format for the second communication speed and enters the data into the high speed communication interface.

Advantageous Effects of Invention

The present invention switches the communication target of a household appliance control device either to a low speed communication interface or to a data processing device by a switching device. Furthermore, as the communication target of the household appliance control device is switched to the data processing device, the data processing device converts data entered via a high speed communication interface to a first communication speed format and outputs the data to the household appliance control device via the switching device, and converts data entered from the household appliance control device via the switching device to a second communication speed format and enters the data into the high speed communication interface. Furthermore, the data processing device can output the processing results both to the household appliance control device and to the high speed communication interface.

In this way, the household appliance can communicate with an external device connected to a network not only via the low speed communication interface but also via the high speed communication interface in a format complying with the communication interface. Consequently, the household appliance can communicate with an external device connected via a network by using a low speed communication means and can further transmit/receive a large volume of data to/from an external device in high speed communication.

DESCRIPTION OF EMBODIMENTS

Embodiments of the present invention will be described in detail hereafter with reference to the drawings.

Embodiment 1

Figure 2:
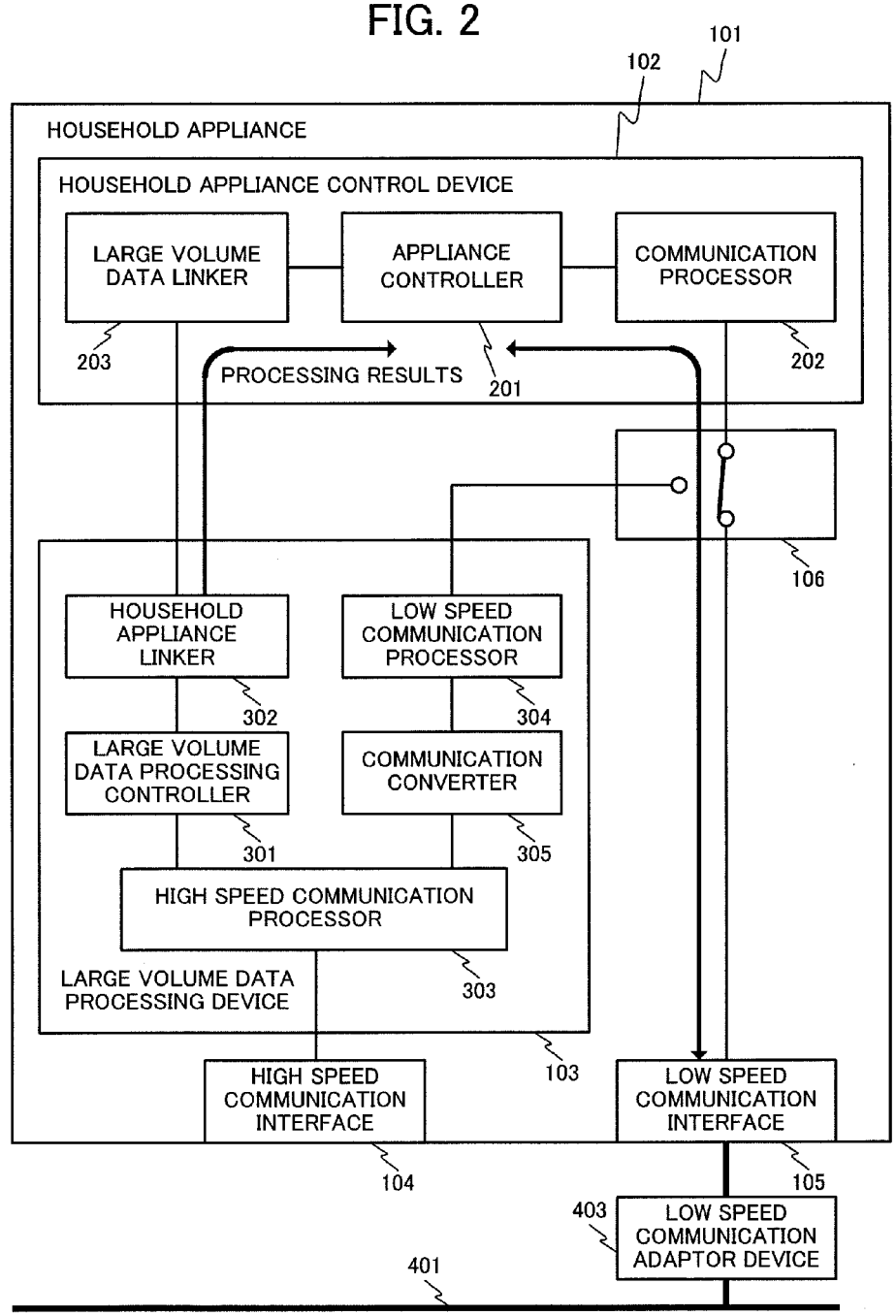
FIG. 2 is an illustration showing an exemplary operation (No. 1) of the household appliance in FIG. 1.
Figure 3:
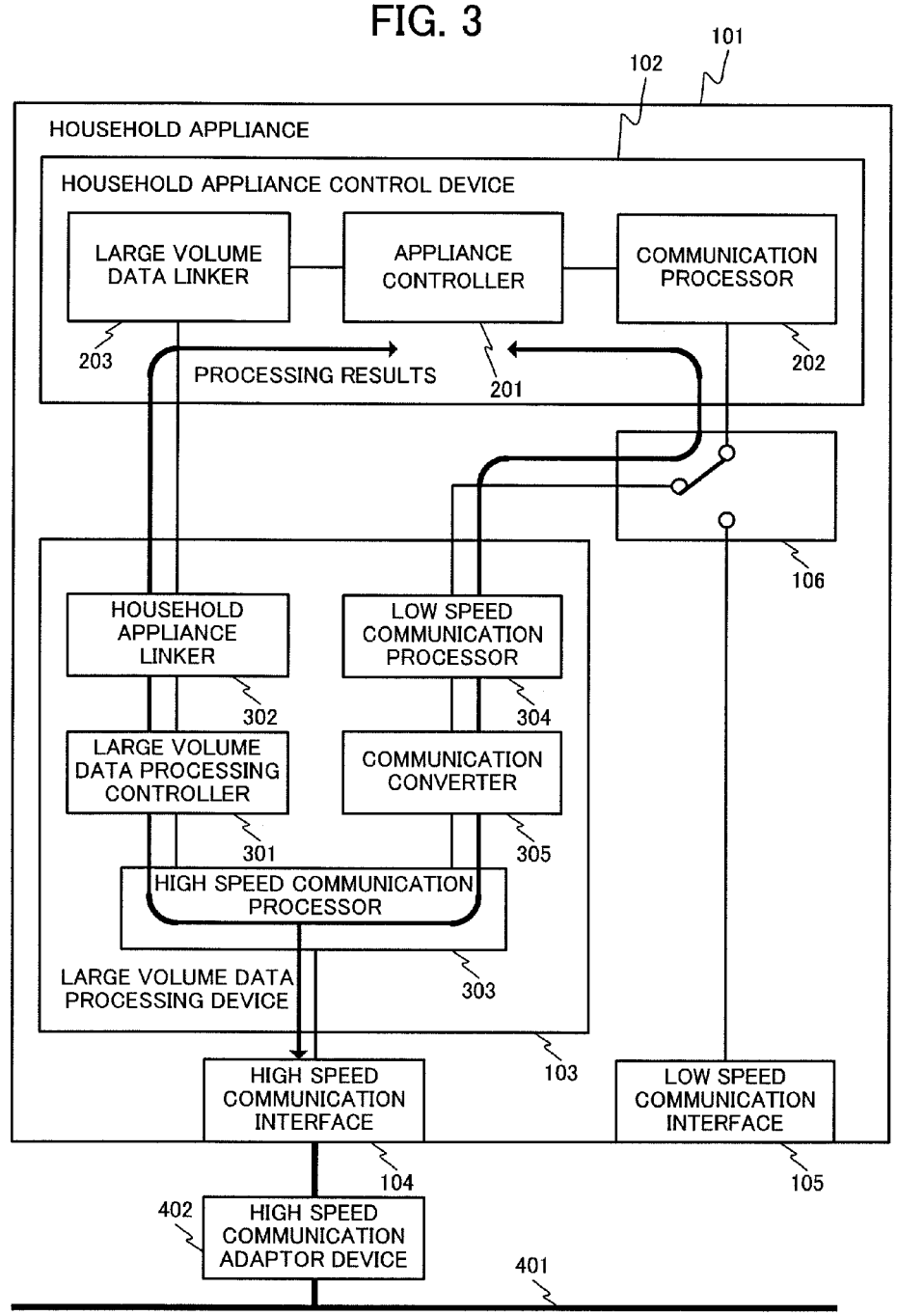
FIG. 3 is an illustration showing an exemplary operation (No. 2) of the household appliance in FIG. 1.

First, Embodiment 1 of the present invention will be described with reference to FIGS. 1 to 3.

Figure 1:
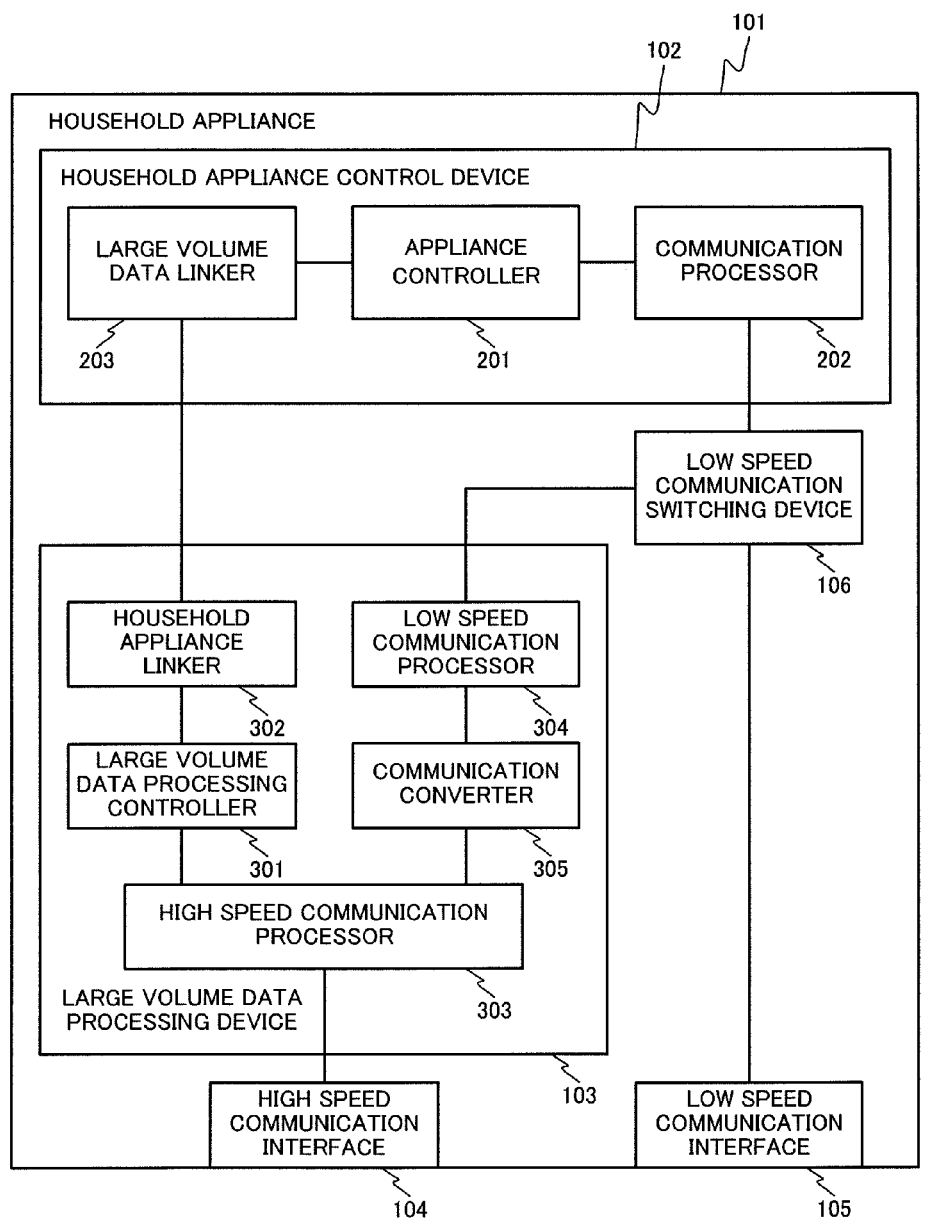
FIG. 1 is a block diagram showing the general configuration of the household appliance according to Embodiment 1 of the present invention.

FIG. 1 shows the general configuration of a household appliance 101. As shown in FIG. 1, the household appliance 101 comprises a household appliance control device 102, a large volume data processing device 103, a high speed communication interface 104, a low speed communication interface 105, and a low speed communication switching device 106.

The household appliance control device 102 controls the appliance body of the household appliance 101. The large volume data processing device 103 processes a large volume of data. Examples of such a large volume of data include image data obtained from an imaging element (such as infrared image data). The large volume data processing device 103 is connected to the household appliance control device 102. The large volume data processing device 103 outputs data processing results to the household appliance control device 102. The household appliance control device 102 controls the appliance body of the household appliance 101 based on the data processing results.

The high speed communication interface 104 is an interface for connecting to a communication adaptor complying with high speed communication (a second communication adaptor operating at a second communication speed). The high speed communication interface 104 is connected to the large volume data processing device 103. The high speed communication interface 104 outputs data entered from the large volume data processing device 103 (for example, the processing results thereof) to the communication adaptor. The high speed communication interface 104 outputs data entered from the communication adaptor to the large volume data processing device 103.

The low speed communication interface 105 is an interface for connecting a communication adaptor complying with low speed communication (a first communication adaptor operating at a first communication speed lower than the second communication speed). The low speed communication interface 105 is connected to the household appliance control device 102 via the low speed communication switching device 106. The low speed communication interface 105 outputs data entered from the household appliance control device 102 via the low speed communication switching device 106 to the communication adaptor. The low speed communication interface 104 outputs data entered from the communication adaptor to the household appliance control device 102 via the low speed communication switching device 106.

The low speed communication switching device 106 switches the communication interface of the household appliance control device 102 to the low speed communication interface 105 or to the large volume data processing device 103. The low speed communication switching device 106 can be configured by a physical switch or an electronic switch. Furthermore, the switch can be switched by input of an operation or depending on the communication adaptor connection state described later.

The large volume data processing device 103 processes a large volume of data and outputs the processing results to the household appliance control device 102, and communicates with an external device via the high speed communication interface 105 and communication adaptor.

The case in which the communication target of the household appliance control device 102 is switched to the large volume data processing device 103 by the low speed communication switching device 106 will be discussed hereafter. In such a case, the large volume data processing device 103 outputs data entered from the high speed communication interface 105 to the household appliance control device 102 via the low speed communication switching device 106, and outputs data entered from the household appliance control device 102 via the low speed communication switching device 106 to the high speed communication interface 105.

The household appliance control device 102 and large volume data processing device 103 are a computer having a CPU and memory. In other words, as the CPU executes programs stored in the memory, the household appliance control device 102 and large volume data processing device 103 link up with hardware such as a radio communication interface to realize their functions.

The household appliance control device 102 comprises an appliance controller 201, a communication processor 202, and a large volume data linker 203.

The appliance controller 201 controls the appliance body of the household appliance 101. The appliance body of the household appliance 101 operates and realizes its primary function under the control of the appliance controller 201. For example, if the household appliance 101 is a rice cooker, the appliance body of the household appliance 101 cooks rice under the control of the appliance controller 201.

The communication processor 202 is connected to the appliance controller 201. The communication processor 202 conducts communication between the household appliance 101 and an external device. The communication speed in this case (a first communication speed) is relatively low. The communication processor 202 outputs data entered from outside the household appliance control device 102 to the appliance controller 201, and outputs data entered from the appliance controller 201 to the outside of the household appliance control device 102.

The large volume data linker 203 is connected to the appliance controller 201. Furthermore, the large volume data linker 203 is connected to the large volume data processing device 103. The large volume data linker 203 links up with the large volume data processing device 103. More specifically, the large volume data linker 203 receives data processed by the large volume data processing device 103 (for example, the processing results from the large volume data processing device 103), and outputs the data to the appliance controller 201.

The large volume data processing device 103 comprises a large volume data processing controller 301, a household appliance linker 302, a high speed communication processor 303, a low speed communication processor 304, and a communication converter 305.

The large volume data processing controller 301 processes a large volume of data. As mentioned above, examples of a large volume of data include image data obtained from an imaging element.

The household appliance linker 302 is connected to the large volume data processing controller 301. Furthermore, the household appliance linker 302 is connected to the large volume data linker 203 of the household appliance control device 102. The household appliance linker 302 links up with the large volume data linker 203. The household appliance linker 302 outputs data processed by the large volume data processing controller 301 (the processing results) to the large volume data linker 203 of the household appliance control device 102. Furthermore, the household appliance linker 302 acquires the current state of the household appliance 101 from the appliance controller 201 via the large volume data linker 203 of the household appliance control device 102 and outputs the current state to the large volume data processing controller 301.

The high speed communication processor 303 is connected to the large volume data processing controller 301. Furthermore, the high speed communication processor 303 is connected to the high speed communication interface 104. Furthermore, the high speed communication processor 303 is connected to the communication converter 305. The high speed communication processor 303 inputs/outputs data from/to the high speed communication interface 104. The high speed communication processor 303 outputs data relating to a large volume of data among data entered from the high speed communication interface 104 to the large volume data processing controller 301. Furthermore, the high speed communication processor 303 outputs data relating to the communication processor 202 of the household appliance control device 102 among data entered from the high speed communication interface 104 to the communication converter 305.

The communication converter 305 converts data relating to the communication processor 202 of the household appliance control device 102 between a format for the communication processor 202 of the household appliance control device 102 and a format for the high speed communication processor 303. The communication converter 305 is connected to the low speed communication processor 304.

The low speed communication processor 304 is connected to the low speed communication switching device 106. The low speed communication processor 304 communicates with the communication processor 202 of the household appliance control device 102 via the low speed communication switching device 106.

Operation of the household appliance 101 according to Embodiment 1 of the present invention will be described hereafter.

First, operation of the household appliance 101 while it is connected to a network 401 via the low speed communication interface 105 will be described. As shown in FIG. 2, a low speed communication adaptor device 402 connected to the network 401 is connected to the low speed communication interface 105. Then, the low speed communication switching device 106 is switched to connect the communication processor 202 of the household appliance control device 102 to the low speed communication interface 105. Upon this switching, the low speed communication processor 304 of the large volume data processing device 103 is disconnected from the communication processor 202.

In this state, the communication processor 202 of the household appliance control device 102 can conduct data communication with an external device connected to the external network 401 via the low speed communication adaptor device 402 and low speed communication interface 105. On the other hand, the large volume data processing device 103 processes a large volume of data with the large volume data processing controller 301 and outputs the processing results to the large volume data linker 203 of the household appliance control device 102 via the household appliance linker 302. The large volume data linker 203 outputs the large volume data processing results to the appliance controller 201. The appliance controller 201 of the household appliance control device 102 controls the appliance body of the household appliance 101 based on the large volume data processing results.

As described above, when the low speed communication adaptor device 402 is connected to the low speed communication interface 105, it is possible to control the appliance body of the household appliance 101 based on the large volume data processing results and to control the household appliance 101 from an external device connected to the network 401 via the communication adaptor.

Operation of the household appliance 101 that it is connected to the network 401 via the high speed communication interface 104 will be described hereafter. As shown in FIG. 3, a high speed communication adaptor device 402 connected to the network 401 is connected to the high speed communication interface 105. In this case, the low speed communication switching device 106 is switched to connect the communication processor 202 of the household appliance control device 102 to the low speed communication processor 304 of the large volume data processing device 103. Consequently, the communication processor 202 is disconnected from the low speed communication interface 105.

The large volume data processing device 103 processes a large volume of data with the large volume data processing controller 301 and transmits the processing results to the large volume data linker 203 of the household appliance control device 102 via the household appliance linker 302 as in the case of being connected to the network 401 via the low speed communication interface 105.

Furthermore, the high speed communication processor 303 of the large volume data processing device 103 communicates with an external device connected to the network 401. Data exchanged with the network 401 are classified into data intended to be a large volume of data for the large volume data processing controller 301 and data intended for the communication processor 202 of the household appliance control device 102.

The above classification is conducted using, for example, identifiers contained in the transmitted data or the like. Receiving data from an external device connected to the network 401, the high speed communication processor 303 determines which of the two classes the data belong to. If the data are intended to be a large volume of data for the large volume data processing controller 301, the high speed communication processor 303 outputs the data to the large volume data processing controller 301. The large volume data processing controller 301 processes the entered data.

On the other hand, if the data entered from the network 401 are data intended for the communication processor 202 of the household appliance control device 102, the high speed communication processor 303 outputs the data to the communication converter 305. The communication converter 305 converts the data format of the data to a data format processable by the communication processor 202 of the household appliance control device 102, and outputs the data to the communication processor 202 of the household appliance control device 102 via the low speed communication processor 304 and low speed communication switching device 106.

Furthermore, in order to transmit data from the large volume data processing controller 301 to the network 401, the data are output from the large volume data processing controller 301 to the high speed communication processor 303 and transmitted from the high speed communication processor 303 to the high speed communication interface 104. On the other hand, in order to transmit data from the communication processor 202 of the household appliance control device 102 to the network 401, the data from the communication processor 202 are entered into the low speed communication processor 304 of the large volume data processing device 103. The low speed communication processor 304 outputs the data to the communication converter 305. The communication converter 305 converts the data format of the entered data to a data format of the high speed communication processor 303 and outputs the data to the high speed communication processor 303. The high speed communication processor 303 outputs the data to the high speed communication interface 104. The data output from the high speed communication interface 104 are transferred to an external device on the network 401 via the high speed communication adaptor 402.

As described above, when the household appliance 101 is connected to the network 401 via the high speed communication interface 104, the household appliance 101 can exchange a large volume of data handled by the large volume data processing controller 301 with an external device connected to the network 401 via the high speed communication interface 104 at a second communication speed (at a high speed). Additionally, the household appliance 101 can conduct communication intended for the communication processor 202 of the household appliance control device 102 operating at a first communication speed (at a low speed) via the high speed communication interface 104.

Here, when the high speed communication adaptor device 402 and low speed communication adaptor device 403 are connected to the corresponding high speed communication interface 104 and low speed communication interface 105, respectively, the low speed communication switching device 106 can be connected to either one of them. In such a case, the communication processor 202 of the household appliance control device 102 conducts communication with the network 401 via a communication adaptor device connected by the low speed communication switching device 106 (either the high speed communication adaptor device 402 or the low speed communication adaptor device 403).

As described above in detail, in this embodiment, the communication target of the household appliance control device 102 is switched by the low speed communication switching device 106 either to the low speed communication interface 105 or to the data processing device 103. Furthermore, when the communication target of the household appliance control device 102 is switched to the large volume data processing device 103, the large volume data processing device 103 converts data entered via the high speed communication interface 104 to a format for the first communication speed (low speed) and outputs the data to the household appliance control device 102 via the low speed communication switching device 106, and converts data entered from the household appliance control device 102 via the low speed communication switching device 106 to a format for the second communication speed (high speed) and enters the data into the high speed communication interface 104. Furthermore, the large volume data processing device 103 can output the processing results both to the household appliance control device 102 and to the high speed communication interface 104.

In this way, the household appliance 101 can communicate with an external device connected to the network 401 not only via the low speed communication interface 105 but also via the high speed communication interface 104 in a format complying with the communication interface. Consequently, the household appliance 101 can communicate with an external device connected via the network 401 by using a low speed communication device and can transmit/receive a large volume of data to/from an external device in high speed communication.

Furthermore, in this embodiment, the household appliance control device 102 simply has the large volume data linker 203 added in order to modify the household appliance 101 supporting only the low speed communication to the one handling a large volume of data, requiring very little modification. Then, the quality and reliability of the household appliance control device 102 can easily be maintained.

Furthermore, in this embodiment, when the household appliance 101 processes a large volume of data, the large volume data processing device 103 executes large volume data processing requiring high throughput and high speed communication processing, and only the processing results are output to the large volume data linker 203 of the household appliance control device 102. Then, the throughput and increase in cost required for the household appliance control device 102 can be suppressed.

Furthermore, in this embodiment, the communication processor 202 of the household appliance control device 102 does not need to be changed for high speed communication. Consequently, the existing low speed communication adaptor device 402 complying with low speed communication can be used as it is.

Embodiment 2

Figure 4:
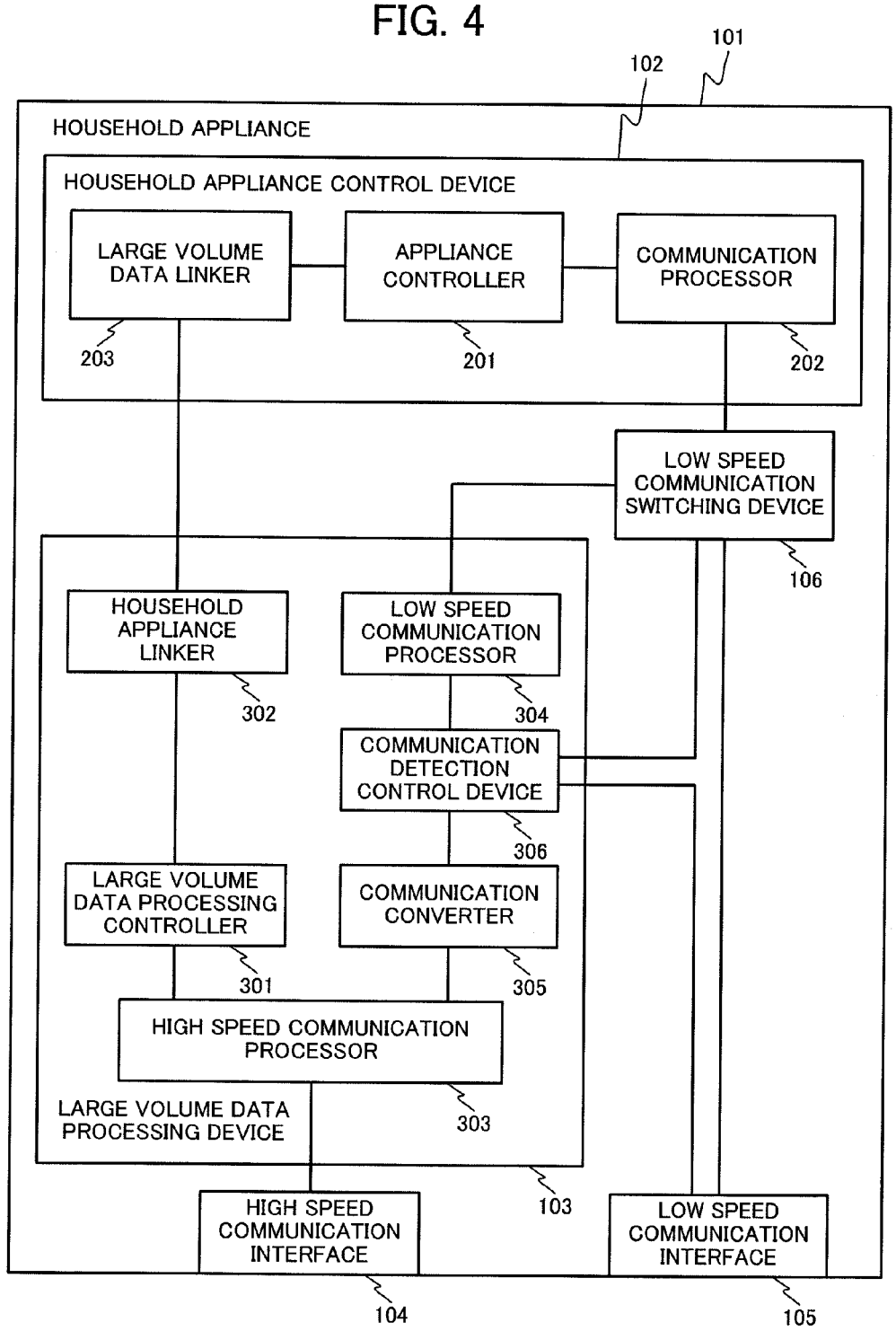
FIG. 4 is a block diagram showing the general configuration of the household appliance according to Embodiment 2 of the present invention.

Embodiment 2 of the present invention will be described hereafter with reference to FIGS. 4 and 5.

A household appliance 101 according to this embodiment is different from the household appliance 101 according to the above-described Embodiment 1 in that the large volume data processing device 103 further comprises a communication detection control device 306. The communication detection control device 306 detects start of communication via the low speed communication interface 105. Furthermore, the communication detection control device 306 can switch the low speed communication switching device 106.

Operation of the household appliance 101 according to Embodiment 2 will be described hereafter.

In the above-described Embodiment 1, when the high speed communication adaptor device 402 and low speed communication adaptor device 403 are connected to the corresponding high speed communication interface 104 and low speed communication interface 105, respectively, the communication processor 202 of the household appliance control device 102 communicates with the network 401 via either one of the communication adaptor devices. On the other hand, in this embodiment, when the high speed communication adaptor device 402 and low speed communication adaptor device 403 are connected to the corresponding high speed communication interface 104 and low speed communication interface 105, respectively, the communication processor 202 of the household appliance control device 102 communicates with the network 401 via both of the connected communication adaptors.

The communication detection control device 306 measures, for example, the signal level of the low speed communication interface 105 with the communication detection control device 306 and detects change in the signal level so as to detect start of communication via the low speed communication interface 105.

When the household appliance 101 according to this embodiment is connected to the network 401, the main purpose of communication with the network 401 is to control the household appliance from an external device connected to the network 401 and to acquire the state of the household appliance 101 from an external device on the network 401. This communication is conducted basically as follows: first, an external device connected to the network 401 sends a request and then the household appliance 101 replies to the request.

The communication detection control device 306 controls the low speed communication switching device 106 according to the state of communication via the network 401.

An exemplary operation of the communication detection control device 306 will be described hereafter.

Figure 5:
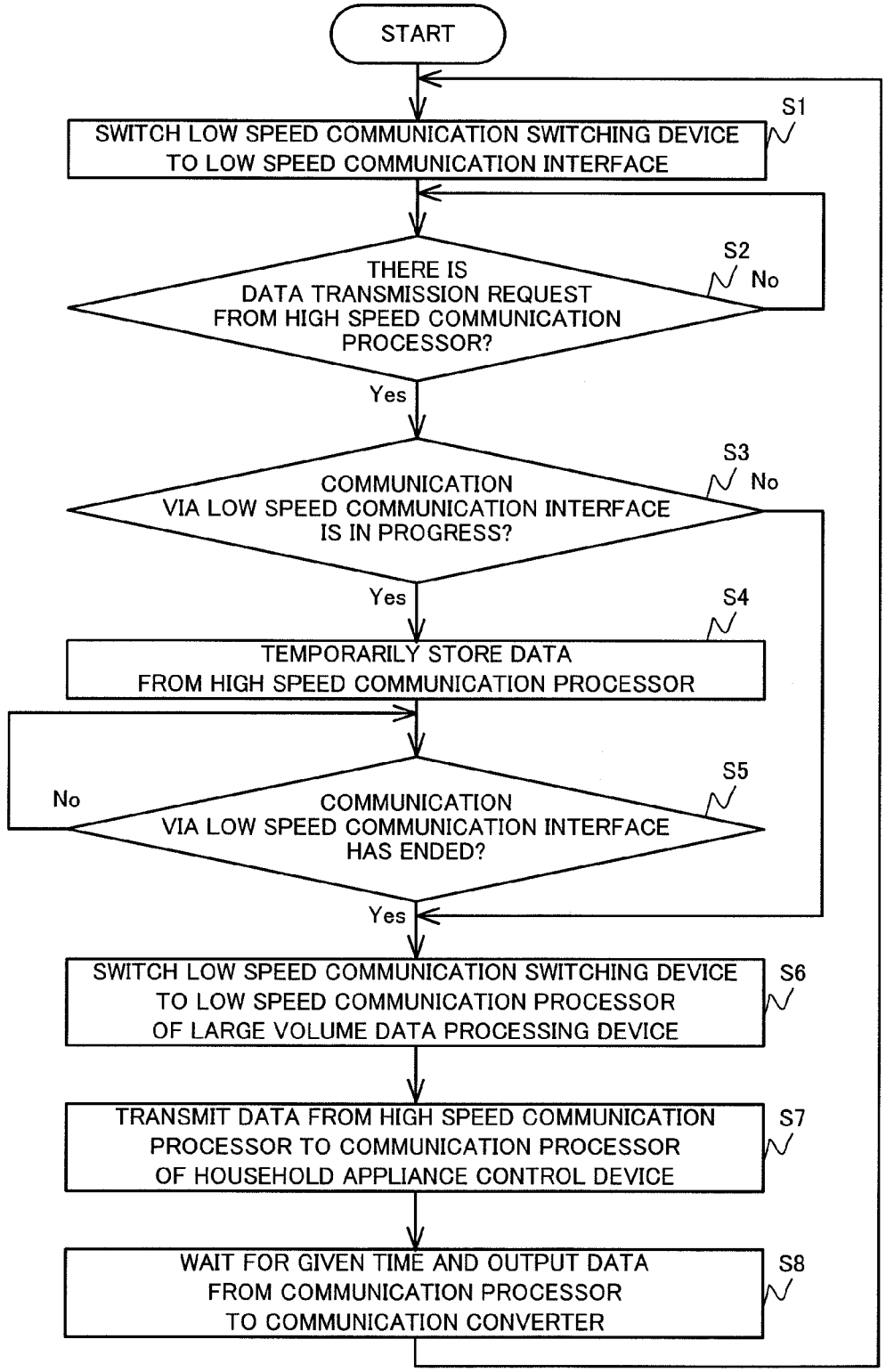
FIG. 5 is a flowchart of the operation of the communication detection control device.

FIG. 5 shows a flowchart of the operation of the communication detection control device 306. As shown in FIG. 5, first, the communication detection control device 306 switches the low speed communication switching device 106 to the low speed communication interface 105 (Step S1). More specifically, the communication detection control device 306 normally connects the low speed communication switching device 106 to the low speed communication interface 105 so that the low speed communication interface 105 and communication processor 202 communicate with each other.

Subsequently, the communication detection control device 306 waits until the high speed communication processor 303 makes a request for transmitting data to the communication processor 202 of the household appliance control device 102 (Step S2; No). In other words, the communication detection control device 306 continues to maintain the low speed communication switching device 106 in the state allowing for communication between the communication processor 202 and low speed communication interface 105 until a data transmission request is made.

On the other hand, when the high speed communication processor 303 transmits a request for transmitting data to the communication processor 202 of the household appliance control device 102 (Step S2; Yes), the communication detection control device 306 detects change in the signal level at the low speed communication interface 105 to determine whether communication via the low speed communication interface 105 is in progress (Step S3).

If no communication via the low speed communication interface 105 is in progress (Step S3; No), the communication detection control device 306 switches the low speed communication switching device 106 to the low speed communication processor 304 of the large volume data processing device 103 (Step S6), and transmits data transmitted from the high speed communication processor 303 to the communication processor 202 of the household appliance control device 102 via the low speed communication switching device 106 (Step S7).

Furthermore, the communication detection control device 306 waits for a given time, and outputs data received from the communication processor 202 of the household appliance control device 102 to the communication converter 305 (Step S8). After executing the Step S8, the communication detection control device 306 switches the low speed communication switching device 106 to the low speed communication interface 105 again (Step S1).

On the other hand, if there is change in the signal level of the low speed communication interface 105 and it is determined that communication via the low speed communication interface 105 is in progress (Step S3; Yes), the communication detection control device 306 temporarily stores data output from the high speed communication processor 303 (Step S4). Subsequently, the communication detection control device 306 waits for the end of communication via the low speed communication interface 105 (Step S5; No).

If it is determined that the communication via the low speed communication interface 105 has ended (Step S5; Yes), the communication detection control device 306 switches the low speed communication switching device 106 to the low speed communication processor 304 of the large volume data processing device 103 (Step S6). Subsequently, the communication detection control device 306 transmits data from the high speed communication processor 303 to the communication processor 202 of the household appliance control device 102 (Step S7). Subsequently, the communication detection control device 306 waits for a given time, and data are output from the communication processor 202 of the household appliance control device 102 to the communication converter 305 (Step S8). After executing the Step S8, the communication detection control device 306 switches the low speed communication switching device 106 to the low speed communication interface 105 again (Step S1).

Here, in the Step S5, it is possible to determine the end of communication via the low speed communication interface 105 after waiting for a given time since no change in the signal level at the low speed communication interface 105 is detected in order to transmit a reply from the household appliance control device 102 in response to a request transmitted from the low speed communication interface 105.

Operations when the low speed communication interface 105, high speed communication interface 104, and both of them have a communication adaptor connected will be described hereafter.

When only the low speed communication interface 105 has a communication adaptor (the low speed communication adaptor device 403) connected, no transmission request is sent from the high speed communication processor 303 to the communication processor 202 of the household appliance control device 102. Therefore, as shown in FIG. 5, the low speed communication switching device 106 is normally connected to the low speed communication interface 105. In this way, the communication processor 202 of the household appliance control device 102 can communicate with an external device connected to the network 401 via the low speed communication interface 105.

When only the high speed communication interface 104 has a communication adaptor (the high speed communication adaptor device 402) connected, no communication is normally determined in the determination on communication via the low speed communication interface 105 (Step S5). Then, communication from the network 401 to the communication processor 202 of the household appliance control device 102 is available via the high speed communication interface 104.

Furthermore, in this embodiment, as in Embodiment 1, the large volume data processing controller 301 can transmit/receive a large volume of data to/from an external device connected to the network 401 via the high speed communication interface 104 in high speed communication.

Next, the case in which the low speed communication interface 105 and high speed communication interface 104 are connected to the low speed communication adaptor device 403 and high speed communication adaptor device 402, respectively, will be discussed. In such a case, if communication via the low speed communication interface 105 is in progress, the communication via the low speed communication interface 105 is conducted. Furthermore, when a request for transmission from the high speed communication interface 104 to the communication processor 202 of the household appliance control device 102 is transmitted, the communication detection control device 306 determines that no communication via the low speed communication interface 105 is in progress, and at such a time, the communication processor 202 of the household appliance control device 102 communicates with an external device via the high speed communication interface 104. In other words, in this embodiment, communication with the communication processor 202 of the household appliance control device 102 is available both via the high speed communication interface 104 and via the low speed communication interface 105. Furthermore, high speed communication is available for a large volume of data processed by the large volume data processing controller 301 as in the above-described Embodiment 1.

The household appliance 101 according to this embodiment comprises the communication detection control device 306 between the low speed communication processor 304 and communication converter 305. However, the communication detection control device 306 can be provided between the communication converter 305 and high speed communication processor 303.

As described above in detail, in this embodiment, the large volume data processing device 103 further comprises the communication detection control device 306 in addition to the configuration in Embodiment 1. The communication detection control device 306 detects the communication state of the low speed communication interface 105 and if communication via the low speed communication interface 105 is in progress, switches the low speed communication switching device 106 to the low speed communication switching device 106. In this way, the communication processor 202 of the household appliance control device 102 and an external device can communicate using both of the high speed communication interface 104 and low speed communication interface 105.

Embodiment 3

Embodiment 3 of the present invention will be described hereafter with reference to FIG. 6.

Figure 6:
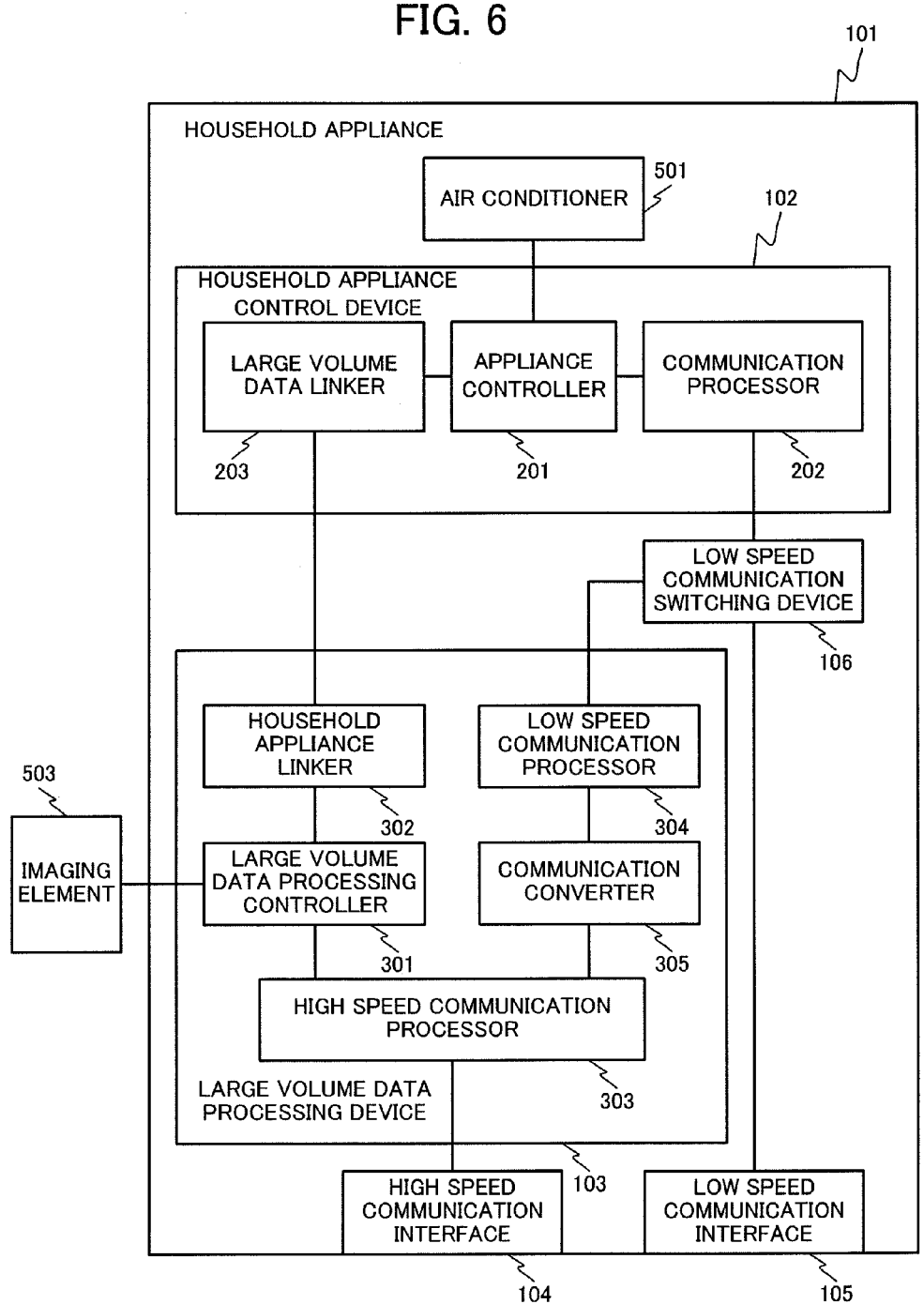
FIG. 6 is a block diagram showing the general configuration of the household appliance according to Embodiment 3 of the present invention.

FIG. 6 shows the general configuration of a household appliance 101 according to this embodiment. As shown in FIG. 6, the household appliance 101 according to this embodiment comprises the same components as the household appliance 101 according to the above-described Embodiment 1. Then, the household appliance 101 further comprises an air conditioner 501 and an imaging element 503.

The air conditioner 501 air-conditions a given living space. The air conditioner 501 is controlled by the appliance controller 201. In other words, the household appliance 101 is an air-conditioning device.

The imaging element 503 is connected to the large volume data processing controller 301. The large volume data processing controller 301 processes data of the imaging element 503. Furthermore, the large volume data processing controller 301 transmits data acquired by the imaging element 503 to the network 401 via the high speed communication processor 303 and high speed communication interface 104 at a high speed.

In the household appliance (air-conditioning device) 101 of this embodiment, the large volume data processing controller 301 processes data acquired by the imaging element 503 and the appliance controller 101 controls the air conditioner 501 based on the processing results entered from the large volume data processing controller 301.

Furthermore, the household appliance (air-conditioning device) 101 can be connected to the network 401 via the low speed communication interface 105 or high speed communication interface 104. Furthermore, when connected to the network 401 via the high speed communication interface 104, the household appliance (air-conditioning device) 101 can transmit a large volume of data acquired by the imaging element 503 to an external device connected to the network 401 in high speed communication.

Here, the household appliance (air-conditioning device) 101 shown in FIG. 6 is based on the configuration of the household appliance 101 according to the above-described Embodiment 1. However, the household appliance (air-conditioning device) 101 can be based on the configuration of the household appliance 101 according to the above-described Embodiment 2.

The household appliance 101 in this embodiment is an air-conditioning device. However, the present invention is applicable to any household appliance or sensor dealing with a large volume of data. For example, the present invention is applicable to a refrigerator-freezer comprising an imaging element capturing images of its inside. The present invention is also applicable to a household appliance storing past operation history and communicating. The present invention is also applicable to a sensor device acquiring/processing a large volume of log data.

In the above-described Embodiments 1 to 3, the high speed communication interface 104 and low speed communication interface 105 are connected to an external network 401 via the high speed communication adaptor device 402 and low speed communication adaptor device 403. However, the high speed communication interface 104 and low speed communication interface 105 can be connected directly to the network 401 without any communication adaptors. Furthermore, the high speed communication interface 104 and low speed communication interface 105 can be connected to other devices for communication.

The programs executed in the above-described embodiments can be stored and distributed on a computer-readable recording medium such as a flexible disc, CD-ROM (compact disc read-only memory), DVD (digital versatile disc), and MO (magneto-optical disc), and installed to configure a system executing the above-described threads.

Furthermore, the programs can be stored in a disc device or the like of a given server unit on a communication network such as the Internet and, for example, superimposed on a carrier wave and downloaded.

Furthermore, when the above-described functions are realized by an OS (operating system) in part or realized by cooperation of an OS and application, only the non-OS part can be stored and distributed on a medium, or downloaded.

Various embodiments and modifications are available to the present invention without departing from the broad sense of spirit and scope of the present invention. The above-described embodiments are given for explaining the present invention and do not confine the scope of the present invention. In other words, the scope of the present invention is set forth by the scope of claims, not by the embodiments. Various modifications made within the scope of claims and scope of significance of the invention equivalent thereto are considered to fall under the scope of the present invention.

This application is based on Japanese Patent Application No. 2011-232218, filed on Oct. 21, 2011, the entire specification, scope of claims, and drawings of which are incorporated herein by reference.

INDUSTRIAL APPLICABILITY

The present invention is suitable for household appliances connected to a network and particularly for household appliances processing a large volume of data.

REFERENCE SIGNS LIST

101 Household appliance
102 Household appliance control device
103 Large volume data processing device
104 High speed communication interface
105 Low speed communication interface
106 Low speed communication switching device
201 Appliance controller
202 Communication processor
203 Large volume data linker
301 Large volume data processing controller
302 Household appliance linker
303 High speed communication processor
304 Low speed communication processor
305 Communication converter
306 Communication detection control device
401 Network
402 High speed communication adaptor device
403 Low speed communication adaptor device
501 Air conditioner
503 Imaging element

The invention claimed is:

1. A household appliance, comprising:
a low speed communication interface configured to connect to a network at a first communication speed;
a high speed communication interface configured to connect to a network at a second communication speed that is faster than the first communication speed;
a household appliance controller configured to control the appliance body;
a data processor configured to process a large volume of data, output a processing result to the household appliance controller, and transmit the processing result via the high speed communication interface; and
a switcher configured to switch a communication target of the household appliance controller between the low speed communication interface and the data processor;
wherein when the communication target of the household appliance controller is switched to the data processor by the switcher, the data processor converts data entered via the high speed communication interface to data of which format is for a communication at the first communication speed and outputs the data to the household appliance controller via the switcher, and converts data entered from the household appliance controller via the switcher to data of which format is for a communication at the second communication speed and enters the data into the high speed communication interface.

2. The household appliance according to claim 1, wherein when the low speed communication interface is connected to a first communication adaptor operating at the first communication speed, the switcher switches the communication target of the household appliance controller to the low speed communication interface.

3. The household appliance according to claim 1, wherein when the high speed communication interface is connected to a second communication adaptor operating at the second communication speed, the switcher switches the communication target of the household appliance controller to the data processor.

4. The household appliance according to claim 1, further comprising:
a communication controller configured to control the switcher to switch the communication target of the household appliance controller to the low speed communication interface when change in the signal level of the low speed communication interface is detected.

5. The household appliance according to claim 1,
further comprising an air conditioner configured to be controlled by the household appliance controller, and
the air conditioner is configured to be used as an air-conditioning device.

6. The household appliance according to claim 1, wherein
the large volume of data is directly supplied to the data processor from the household appliance, neither via the high speed communication interface nor via the switcher.

7. The household appliance according to claim 6, further comprising:
an imaging element, wherein
the imaging element is configured to generate the large volume of data, and then supply the large volume of data to the data processor.

8. A communication control method for controlling communication of an electric appliance that includes
a low speed communication interface connected to a network at a first communication speed,
a high speed communication interface connected to a network at a second communication speed that is faster than the first communication speed,
a household appliance controller controlling the appliance body, and
a data processor processing a large volume of data, outputting a processing result to the household appliance controller, and transmitting the processing result to an external device via the high speed communication interface,
the method comprising, by the electric appliance:
switching a communication target of the household appliance controller between the low speed communication interface and to the data processor, and
conducting a switching control when the communication target of the household appliance controller is switched to the data processor, the switching control includes
converting data entered via the high speed communication interface to data of which format is for a communication at the first communication speed and outputting the data to the household appliance controller via the switcher, and
converting data entered from the household appliance controller to data of which format is for a communication at the second communication speed and entering the data into the high speed communication interface.

9. The communication control method according to claim 8, further comprising:
   controlling a communication controller in the electric appliance to switch the communication target of the household appliance controller to the low speed communication interface when change in the signal level of the low speed communication interface is detected.

* * * * *